United States Patent
Dick

(10) Patent No.: US 7,428,443 B2
(45) Date of Patent: Sep. 23, 2008

(54) MEASUREMENT TRANSMISSION FOR MATERIAL PROCESSING

(75) Inventor: Spencer B. Dick, Portland, OR (US)

(73) Assignee: Precision Automation, Inc., Vancouver, WA (US)

( * ) Notice: Subject to any disclaimer, the term of this patent is extended or adjusted under 35 U.S.C. 154(b) by 0 days.

(21) Appl. No.: 10/897,997

(22) Filed: Jul. 22, 2004

(65) Prior Publication Data

US 2005/0065629 A1    Mar. 24, 2005

Related U.S. Application Data

(60) Provisional application No. 60/574,863, filed on May 26, 2004, provisional application No. 60/510,292, filed on Oct. 9, 2003, provisional application No. 60/508,440, filed on Oct. 3, 2003, provisional application No. 60/489,472, filed on Jul. 22, 2003.

(51) Int. Cl.
*G06F 19/00* (2006.01)

(52) U.S. Cl. .................................... 700/117; 700/173

(58) Field of Classification Search ................ 700/90, 700/95, 117, 173
See application file for complete search history.

(56) References Cited

U.S. PATENT DOCUMENTS

| | | | | |
|---|---|---|---|---|
| 5,452,031 A * | 9/1995 | Ducharme | ............ | 351/177 |
| 6,580,959 B1 * | 6/2003 | Mazumder | ............ | 700/121 |
| 6,646,564 B1 * | 11/2003 | Azieres et al. | ............ | 340/679 |
| 6,681,140 B1 * | 1/2004 | Heil | ............ | 700/95 |
| 6,980,874 B2 * | 12/2005 | Cribbs | ............ | 700/110 |
| 2002/0049565 A1 * | 4/2002 | Kirila et al. | ............ | 702/188 |
| 2002/0116980 A1 * | 8/2002 | Kerr et al. | ............ | 73/1.14 |
| 2003/0202091 A1 * | 10/2003 | Garcia et al. | ............ | 348/86 |
| 2004/0008319 A1 * | 1/2004 | Lai et al. | ............ | 351/159 |
| 2004/0109173 A1 * | 6/2004 | Finarov et al. | ............ | 356/625 |

* cited by examiner

*Primary Examiner*—Kidest Bahta
(74) *Attorney, Agent, or Firm*—Kolisch Hartwell, P.C.

(57) ABSTRACT

A system for processing material includes a measuring device, a processing apparatus, and a mechanism for transmitting measurement information from the measuring device to the processing apparatus.

15 Claims, 1 Drawing Sheet

MEASUREMENT TRANSMISSION FOR MATERIAL PROCESSING

CROSS REFERENCE TO RELATED APPLICATIONS

This application claims priority under 35 U.S.C. § 119 and applicable foreign and international law and incorporates in their entirety the following U.S. Provisional Patent Applications: Ser. No. 60/489,472 filed Jul. 22, 2003; Ser. No. 60/508, 440 filed Oct. 3, 2003; Ser. No. 60/510,292 filed Oct. 9, 2003 and Ser. No. 60/574,863 filed May 26, 2004.

This application also incorporates by reference in their entireties and for all purposes, the following U.S. Patent Applications, PCT Applications and Patents: Ser. No. 10/642, 350 filed Aug. 15, 2003; Ser. No. 10/645,828 filed Aug. 20, 2003; Ser. No. 10/645,831 filed Aug. 20, 2003; Ser. No. 10/645,865 filed Aug. 20, 2003; Ser. No. 10/645,832 filed Aug. 20, 2003; Ser. No. 10/645,826 filed Aug. 20, 2003; Application No. PCT/US03/26185 filed Aug. 20, 2003; Application No. PCT/US03/26186 filed Aug. 20, 2003; and U.S. Pat. Nos. 5,444,635 and 6,631,006.

FIELD OF THE INVENTION

The invention relates to manufacturing. In particular, the invention involves systems and methods of automated measuring, cutting, and/or further processing of materials.

BACKGROUND

In manufacturing industries, it is often necessary or desirable to custom cut or otherwise process material according to specific dimensions of other product components. For example, in the plastic window industry, windows are built out of standard plastic profiles that are cut into a frame, similar to the way a picture frame is assembled with mitered corners. Assembly of the frame is carried out by placing the pieces into a machine in their assembled shape. The machine holds the parts apart by about ⅛-inch at each mitered joint. A heated steel plate is placed between the pieces at the miter corners. The plate is heated up until the plastic material is in a molten state. At this point, the plates are quickly withdrawn and the machine pushes the four pieces together at the mitered joints, and the pieces bond to each other making one unitized frame.

A significant problem with the process described above results because the process is sometimes inaccurate. To install the glass in the frame, it is necessary to cut the small pieces that retain the glass from measurements that are taken after the window frame is made. Typically, distances within the frame are measured and then written down. The operator then cuts custom pieces according to the written dimensions, and subsequently installs the glass and the custom retention pieces within the frame.

There are numerous other examples of processes that require handling steps based on measurements made at a location remote from processing equipment such as a saw. It is often inefficient, inconvenient, and/or impractical to manually measure, write, and then enter dimensions into processing equipment at another location.

SUMMARY

Systems for automatically transmitting and utilizing measurement information from a measurement device to material handling apparatus include a measuring device, a signal transmitting device, a receiver, and a controller connected to a material handling apparatus.

DETAILED DESCRIPTION

Figure 1:
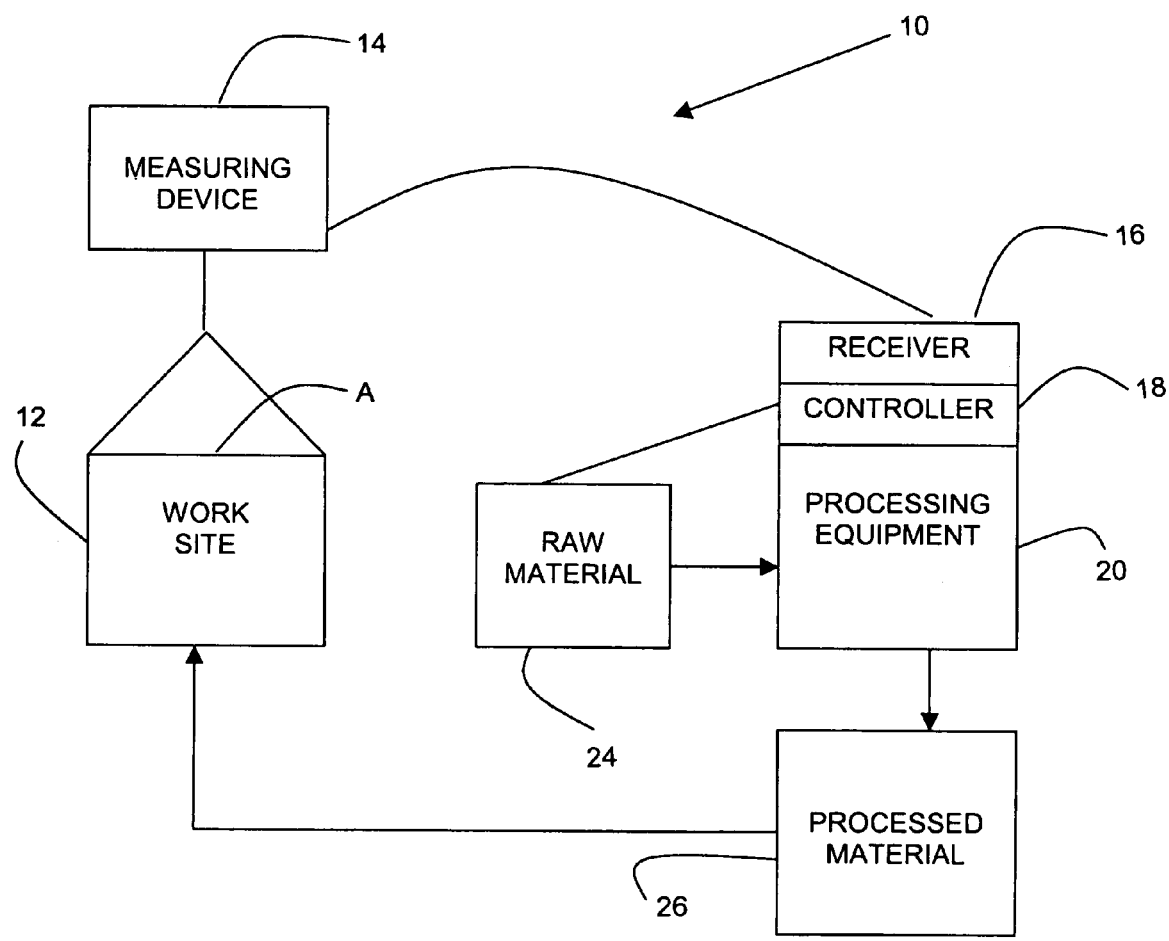
FIG. 1 is a schematic flow chart illustrating systems and methods of processing materials remotely for subsequent manufacturing at a work site.

FIG. 1 is a schematic drawing of system 10 for processing material. Manufacturing, assembly, or construction is being carried out at work site 12. A piece of material is required in space A. The material must be cut according to a precise dimension of space A. Measuring device 14 is used to measure space A. Measurement information is then transmitted or relayed automatically from measuring device 14 to receiver 16. Receiver 16 is connected to controller 18. Controller 18 is programmed to instruct processing equipment 20 to carry out processing of raw material 24 based on measurement data received from receiver 16. Processed material 26 produced from processing equipment 20 is then transported to work site 12 for assembly and/or installation in space A.

A work site may be any place where building, construction, or assembly is taking place. For example, a work site may be a place where a building is being constructed, or a location where an item is being produced including but not limited to premises for making cabinets, furniture, door or window systems, etc. A work site that is remotely located from a processing apparatus means that the work site is off-line, for example, in another part of a shop or someplace even further way.

A measuring device may be any implement or tool that may be used to determine a length, distance, or shape of a structure, product, work piece, or component thereof. For example, a measuring device may include calipers, rulers, gauges, tape measures, micrometers, laser distance measurers, digital measuring tapes, laser targeting range finders, ultrasonic distance detectors, scaling devices, plan wheels, thickness gauges, among others.

A signal transmitting device may be any device capable of generating and sending a signal indicating a measurement parameter generated by a measuring device. Signals may be transmitted from measuring device 14 to receiver 16 by radio transmission or by a cable connection. The signal may be analog or digital.

The receiver is any device capable of detecting a signal from measuring device 14 in a form that can be transmitted and utilized by controller 18.

Processing equipment 20 may be a saw apparatus, for example, such as the ones described in the patents and applications incorporated by reference above. Alternatively, equipment 20 may be configured for carrying out other processing steps such as boring, punching, routing, mortising, sanding, drilling, shearing, bonding, sewing, heating, UV curing, painting or graphics application, among others. Processing equipment 20 may also be configured to carry out multiple processing steps such as any combination of the steps mentioned above.

Raw material 24 may be any material that is supplied in a stock form requiring processing before being incorporated into a product, building structure, or fixture at a work site. For example, raw material 24 may be lumber, plastic, composite, textile, among others.

EXAMPLE

This example describes a system for manufacturing plastic windows products, as referred to in the background-section above. The system includes a pair of calipers, and a signal transmission device. An operator measures, for example, an inside of the rabbit, and then pushes a button which sends the measurement information via transmitter, receiver, and controller, to an automatic positioner cooperatively assembled with a saw. The signal may be transmitted via a radio frequency transmitter. The automatic positioning system has a receiver attached to it configured to receive radio signals from the signal transmitter connected to the measuring device.

The positioner or stop may then perform any one or more of the following functions:

1. Store the information in a cut list to allow the operator to cut pieces in a batch later applying an optimization algorithm to the batch to utilize the material to receive its highest yield. Labels may also be automatically generated relating to the specific position in the window, the specific window, the specific job, customer, etc.

2. The positioner may also respond by automatically moving a stop to the appropriate location so that stock is cut to the desired dimension. The operator may then cut the piece and give it back to another person for installation.

3. The positioner may have a hopper for holding stock material. A piece falls from the hopper in front of the pusher. The pusher automatically advances when it senses the stock present. The first miter cut is performed. Subsequent measurements are received causing the stop to advance and the piece just measured is cut until the remaining stock is too short. The machine then reloads and processes the next cut. This allows an operator to make a series of measurements and then walk to the sawing system where parts are waiting in the order that they were measured.

4. In some cases, the opening for the pieces may not be a square. For example, the opening may be trapezoidal. In this case, the software may require six measurements, each length of the trapezoid's four sides, and two diagonal measurements. The positioner sets the length and in turn rotates the saw to the correct angle for each piece. This method may be used in the production of non-square openings.

5. The measuring device may also be equipped with a storage device so that measurements of the opening may be made at a job site. The device may then be brought back to a shop where the sizes are downloaded to the positioning system and the above procedure is followed.

The invention allows quick custom cutting of parts. The process of manufacturing has tolerances and some items such as wooden doors have such a broad range of tolerances that there may exist substantial deviations between two doors built to be identical to it. If a person is installing a mitered molding either inside or outside the door frame, it may be necessary to cut the part custom for each unit. The invention may simplify this process so that it may be carried out more rapidly and without requiring a highly skilled laborer.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

I claim:

1. A processing system for customizing and incorporating workpieces into a manufactured item comprising a measuring device configured to determine a physical parameter of a space or structure being manufactured at a first work site which is remotely located off-line from a second work site, a signal transmitting device connected to the measuring device for transmitting a signal indicative of a physical parameter measured by the measuring device, a processing apparatus, located at the second work site, configured to alter material stock for incorporation in the structure being manufactured at the first work site, the processing apparatus including an automatic positioner cooperatively assembled upstream from a saw, and a controller connected to the processing apparatus at the second work site, the controller having a receiving device configured to receive signals from the transmitting device, the controller being programmed to move the positioner to an appropriate position relative to the saw, to initiate cutting of a workpiece according to the physical parameter measured by the measuring device to produce pieces dimensioned for incorporation in the structure being manufactured at the first work site.

2. The system of claim 1, wherein the controller is programmed to optimize cutting of raw stock based on a cut list entered in the controller.

3. The system of claim 1, wherein the controller is programmed to create or alter a cut list based on measurements made by the measuring device.

4. The system of claim 1, wherein the measuring device includes calipers.

5. The system of claim 1, wherein the receiving device is configured to receive radio signals from the transmitting device.

6. The system of claim 1, wherein the physical parameter is a length.

7. The system of claim 1, wherein the controller is programmed to automatically generate labels indicating information about workpieces processed by the processing apparatus.

8. The system of claim 1, wherein the controller is programmed to receive multiple measurements of a trapezoid, and to rotate the saw or diagonal cutting in accordance with the measurements.

9. The system of claim 8, wherein the controller receives six measurements, each length of the trapezoid's four sides, and two diagonal measurements.

10. A processing system for customizing and incorporating work pieces into a manufactured item comprising a caliper tool configured to measure a length dimension of a partially constructed building structure at a work site, the caliper tool having a signal transmitting device for transmitting a signal indicative of the length dimension, and a button for manually initiating transmission of the signal, a processing apparatus including a saw and an automatic positioner upstream from the saw for positioning a work piece for cutting by the saw, wherein the work site is located remotely off-line from the processing apparatus, and a controller connected to the processing apparatus, the controller having a receiving device configured to receive signals from the transmitting device of the caliper tool, the controller being programmed to control operation of the positioner to move a work piece relative to the saw for cutting the work piece in accordance with the length dimension measured by the caliper tool.

11. The system of claim 10, wherein the processing apparatus is configured to cut wood.

12. The system of claim 10, wherein the controller is programmed to optimize cutting of raw stock based on a cut list entered in the controller.

13. The system of claim 10, wherein the controller is programmed to create or alter a cut list based on measurements made by the caliper tool.

14. The system of claim 10, wherein the receiving device is configured to receive radio signals from the transmitting device.

15. The system of claim 10, wherein the length is linear.

* * * * *